US012764588B2

(12) United States Patent
Cui et al.

(10) Patent No.: US 12,764,588 B2
(45) Date of Patent: Oct. 13, 2026

(54) LAYER 1 MEASUREMENT ON SYNCHRONIZATION SIGNAL BLOCK-LESS SECONDARY CELL

(71) Applicant: Apple Inc., Cupertino, CA (US)

(72) Inventors: Jie Cui, San Jose, CA (US); Yang Tang, San Jose, CA (US); Qiming Li, Beijing (CN); Haitong Sun, Cupertino, CA (US); Hong He, Saratoga, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 267 days.

(21) Appl. No.: 18/763,793

(22) Filed: Jul. 3, 2024

(65) Prior Publication Data

US 2025/0048159 A1 Feb. 6, 2025

Related U.S. Application Data

(60) Provisional application No. 63/517,874, filed on Aug. 4, 2023.

(51) Int. Cl.
*H04W 24/10* (2009.01)

(52) U.S. Cl.
CPC .................................. *H04W 24/10* (2013.01)

(58) Field of Classification Search
CPC ..... H04B 7/0632; H04L 5/001; H04L 5/0098; H04W 24/10; H04W 56/0015; H04W 76/15
See application file for complete search history.

(56) References Cited

U.S. PATENT DOCUMENTS

2022/0303842 A1* 9/2022 Cui .................. H04W 36/0094
2022/0303921 A1* 9/2022 Cui ...................... H04W 24/10
2024/0121626 A1* 4/2024 Dimou ................. H04W 16/28
2024/0235798 A1* 7/2024 Ryu ...................... H04L 5/0098
2024/0340820 A1* 10/2024 Cho ...................... H04L 5/0051
2026/0074869 A1* 3/2026 Ryu ...................... H04B 7/0632

OTHER PUBLICATIONS

Vivo, Discussion on SSB-less SCell operation for network energy saving, 3GPP TSG-RAN WG4 Meeting #107 Incheon, KR, R4-2308222, 8 pages, May 22-26, 2023.*
WF on RRM requirements for NR network energy saving, Huawei, HiSilicon, 3GPP TSG-RAN WG4 Meeting #107, R4-2310086, May 22-26, 2023 7 pages.
3rd Generation Partnership Project; Technical Specification Group Radio Access Network; NR; Physical layer procedures for data (Release 17), 3GPP TS 38.214 V17.6.0, Jun. 2023, 231 pages.
3rd Generation Partnership Project; Technical Specification Group Radio Access Network; NR; Requirements for support of radio resource management (Release 18), 3GPP TS 38.133 V18.2.0, Jun. 2023, 5815 pages.

* cited by examiner

*Primary Examiner* — Frank Duong
(74) *Attorney, Agent, or Firm* — Kilpatrick Townsend & Stockton LLP

(57) ABSTRACT

The present application relates to devices and components including apparatus, systems, and methods to configure a synchronization signal block (SSB)-less secondary cell (SCell) for layer 1 measurement.

20 Claims, 10 Drawing Sheets

LAYER 1 MEASUREMENT ON SYNCHRONIZATION SIGNAL BLOCK-LESS SECONDARY CELL

CROSS-REFERENCE TO RELATED APPLICATIONS

This application claims priority to U.S. provisional application No. 63/517,874, entitled "Layer 1 Measurement on Synchronization Signal Block-less Secondary Cell," filed on Aug. 4, 2023, the disclosure of which is incorporated by reference herein in its entirety for all purposes.

TECHNICAL FIELD

The present application relates to the field of wireless technologies and, in particular, to layer 1 (L1) measurement configuration for synchronization signal block (SSB)-less secondary cells (SCells).

BACKGROUND

Third Generation Partnership Project (3GPP) networks can provide services for user equipments (UEs) within cells operated by the networks. As part of accessing and utilizing the networks, the UEs perform measurements on signals received from the networks. As one example, the UEs perform layer 1 (L1) measurements on synchronization signal blocks (SSBs) transmitted by the network. Accordingly, the networks transmit SSBs within the cells during operation for L1 measurements by the UEs.

DETAILED DESCRIPTION

Figure 1:
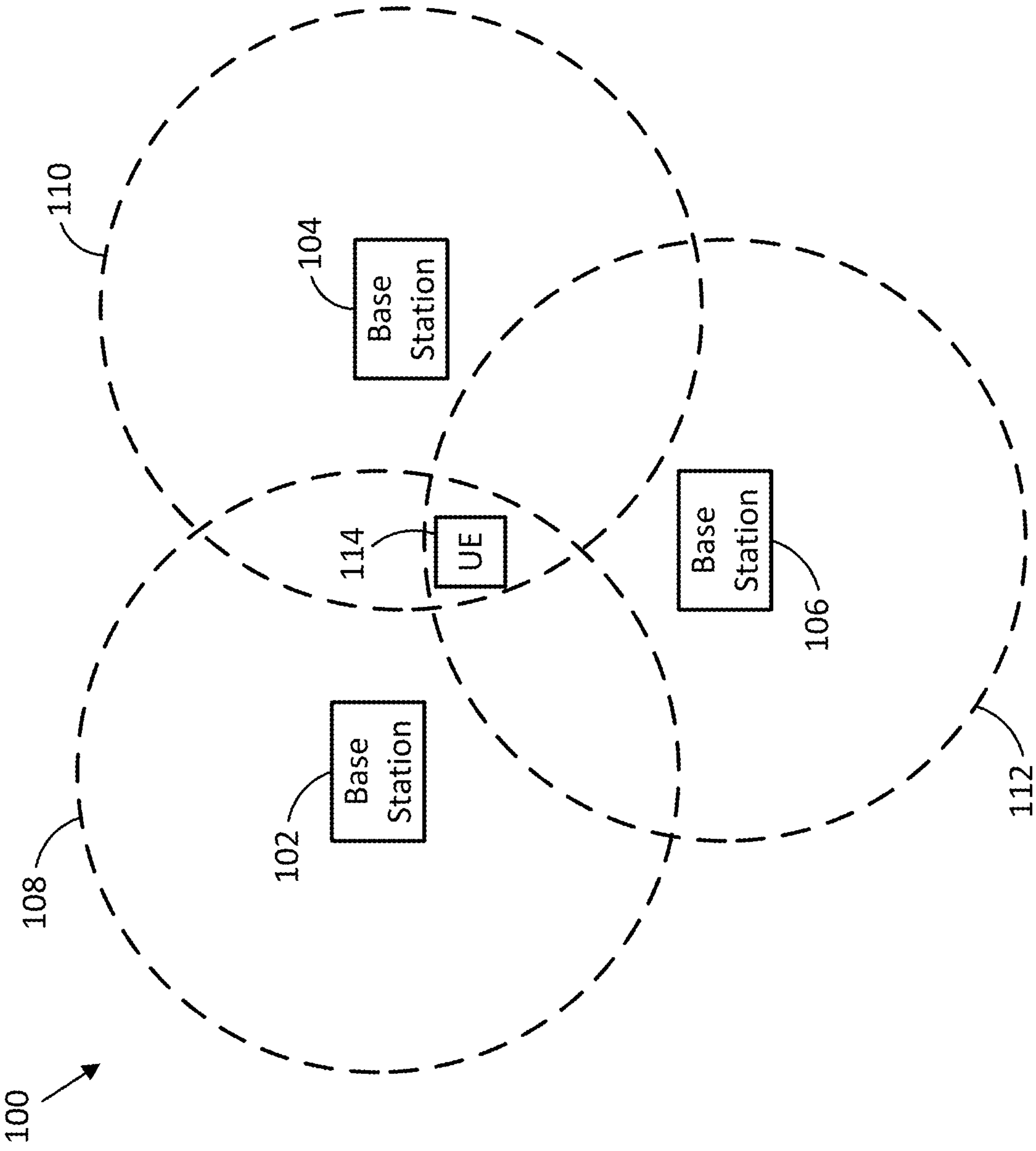
FIG. 1 illustrates an example system arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B); and the phrase "based on A" means "based at least in part on A," for example, it could be "based solely on A" or it could be "based in part on A."

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment"

or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

The term "based at least in part on" as used herein may indicate that an item is based solely on another item and/or an item is based on another item and one or more additional items. For example, item 1 being determined based at least in part on item 2 may indicate that item 1 is determined based solely on item 2 and/or is determined based on item 2 and one or more other items in embodiments.

As networks have continued to develop, a desire for energy savings has developed. In particular, approaches for providing energy savings by the networks have become desirable. Approaches described herein may include configuring cells of a network to omit synchronization signal block (SSB) transmissions during operation. For example, the network may configure one or more base stations to omit transmission of SSBs within one or more of the cells of the network. The cells for which the SSB transmissions are to be omitted can be secondary cells (SCells) for the UEs being serviced in some embodiments. The SCells in which transmissions of SSBs are to be omitted can be referred to as SSB-less SCells. The cells may be configured to omit transmission of the SSBs are part of a network energy saving (NES) mode to provide energy savings for the network.

Issue Description

In radio access network work group 4 (RAN4) #107 meeting, the WF was agreed in R4-2310086 (WF on RRM requirements for NR network energy saving. (May 22-May 26, 2023). 3GPP TSG-RAN WG Meeting #107). An issue (which may be referred to "Issue 1-4-1") discussed was whether to have layer 1 (L1) measurement on SSB-less SCell. Proposals listed below were indicated as for further study (FFS)

For a first proposal (which may be referred to as "Proposal 1"), L1 measurement on less SCell is not needed. A first option of the first proposal (which may be referred to as "Proposal 1a") may be, for SSB-less SCell activation, when the conditions about round trip delay (RTD), power imbalance and tracking reference signal (TRS) are met, the L1/layer 3 (L3) measurement can be skipped. A second option of the first proposal (which may be referred to as "Proposal 1b") may be, when channel state information reference signal (CSI-RS) resources for L1 measurement are not configured, as long as the RTD, power difference conditions are ensured between two carriers, the SSB-less SCell can fully leverage the information from an already activated serving cell, the corresponding L1 measurements can be skipped.

For a second proposal (which may be referred to as "Proposal 2"), CSI-RS based L1 measurement is needed on SSB-less SCell. A first option of the second proposal (which may be referred to as "Proposal 2a") may be RAN4 to assume no SSB but with CSI-RS resource for L1 measurement on the frequency range 1 (FR1) inter-band SSB-less SCell. A second option of the second proposal (which may be referred to as "Proposal 2b") may be if the conditions are not met but CSI-RS based measurement is supported and configured, L1 measurement needs to be specified for SSB-less SCell operation. A third option of the second proposal (which may be referred to as "Proposal 2c") may be when CSI-RS resources for L1 measurement is configured, the legacy requirements for CSI-RS based L1 measurement can be reused for SSB-less SCell operation.

For a first option of a third proposal (which may be referred to as "Proposal 3a"), RAN4 needs to discuss the impact on the CSI-RS based L1 measurement requirements due to SSB-less SCell operation. For a second option of the third proposal (which may be referred to as "Proposal 3b"), RAN4 can study whether and how to perform radio link management (RLM)/bidirectional forwarding detection (BFD)/candidate beam detection (CBD) on the SSB-less SCell based on reference Cell measurement.

For a third option of the third proposal (which may be referred to as "Proposal 3c"), for L1/L3 measurement, following two options can be discussed in parallel in RRM session. As an option of the third option of the third proposal (which may be referred to as "Option 1"), no SSB but with CSI-RS resource for L1/L3 measurement on the inter-band SSB-less SCell. As another option of the third option of the third proposal (which may be referred to as "Option 2"), no SSB and no CSI-RS resource for L1/L3 measurement on the inter-band SSB-less SCell.

For a fourth proposal (which may be referred to as "Proposal 4"), when RTD, power difference conditions are ensured and CSI-RS based L1 measurement is not configured, L1 measurement on SSB-less SCell is not needed. When CSI-RS based L1 measurement is configured, legacy requirements can apply. There was no conclusion on the L1 measurement on the SSB-less.

Issue 1-1-1/2/3: Scenario 1/2/2a has agreements in WF R4-2310086. The agreements include continue RAN4 work on the following SSB-less SCell scenarios. For a first scenario (which may be referred to as "Scenario 1"), SCell without SSB transmission and with TRS transmission. For a first option of a second scenario (which may be referred to as "Scenario 2a"), SCell without SSB transmission and without any other downlink (DL) transmissions, but with uplink (UL) reception at the network (NW) side. Note, no radio access network radio layer 1 (RAN1) impacts are expected, and no RAN4 requirements will be defined if the scenario is not supported from RAN1 specification perspective. Deprioritize RAN4 work on the following SSB-less SCell scenario. For a second scenario (which may be referred to as "Scenario 2"), SCell without SSB transmission and without TRS transmission. Send liaison statement (LS) to radio access network work group 1/2 (RAN1/2) to check on support of Scenario 2a from RAN1/2 specifications perspective.

Regarding whether user equipment (UE) can reuse L1 result from primary cell (PCell) to inter-band SCell, technically it's not very likely, because interference level is different (e.g., BFD or layer 1-signal to interference plus noise ratio (L1-SINR), received signal strength indicator (RSSI) may also be different, depending on different scheduling and traffic from serving and neighbor cells), the channel coefficience is different for different component carriers (CCs) for L1 one-shot measurements, and it cannot directly reused between two CCs for transmission (Tx) digital beam or precoding, L1 reference signal (RS) can also be used for channel quality indicator (CQI), precoding matrix indicator (PMI), rank indicator (RI), it even has sub-band reporting, it can't be reused.

BFD evaluation is based on signal to interference plus noise ratio (SINR) measurement, and there might be different interference levels between SSB-less SCell and other active serving cell. To be addressed is how to perform BFD on an SSB-less SCell.

Layer 1 reference signal received power (L1-RSRP) measurement cannot either be reused directly from an active serving cell. To be addressed is how to perform L1-RSRP on an SSB-less SCell. In RAN1 technical specification (TS) 38.214 (3$^{rd}$ Generation Partnership Project; Technical Specification Group Radio Access Network; NR; Physical layer procedures for data (Release 17). (June 2023). 3GPP TS 38.214, 17.6.0), it was specified that, a UE does not expect to be configured with a channel state information (CSI) reporting configuration (CSI-ReportConfig) that is linked to a CSI resource configuration (CSI-ResourceConfig) containing an non-zero power channel state information reference signal resource set (NZP-CSI-RS-ResourceSet) configured with TRS information (trs-Info) and with the CSI-ReportConfig configured with the higher layer parameter time restriction for channel measurements (timeRestrictionForChannelMeasurements) set to 'configured'. In scenario 1, SCell without SSB transmission and with TRS transmission, if CSI-RS for L1 measurement is not configured on the SSB-less SCell, then it shall consider to use TRS for L1-RSRP.

Intermediate distribution frame (IDF) structure may be in order to not configure RS for L1 measurement on the target SSB-less SCell, if network won't configure the RS for L1 measurement on SSB-less SCell, network needs to collect sufficient information of channel condition/quality between SSB-less SCell and other active serving cell. Further, in order to not configure RS for L1 measurement on the target SSB-less SCell, UE is configured to measure and report the delta L1-RSRP or channel quality between CCs for network decision to mute the RS on the SSB-less SCell.

If RS for L1 measurement is not configured on target SSB-less SCell a few options can be implemented. In a first option (which may be referred to as "Option 1"), for BFD and L1-SINR measurement, the SINR is based on channel measurement resource (CMR) on an active serving cell, and interference measurement resource (IMR), which may or may not be on the SSB-less SCell. Both BFD and L1-SINR will need CMR and IMR configuration to determine the SINR measurement. IMR can be a zero power channel state information reference signal (ZP-CSI-RS) configured on SSB-less SCell, and it only indicates the time/frequency position to measure the interference (the real CSI-RS is not transmitted from network on SSB-less SCell). In a second option (which may be referred to as "Option 2), in scenario 1, use TRS for L1 measurement.

Approach

FIG. 1 illustrates an example system arrangement 100 in accordance with some embodiments. For example, the illustrated system arrangement 100 may implement one or more of the approaches described throughout this disclosure. The system arrangement 100 illustrates example cells that may be provided by a network.

Figure 10:
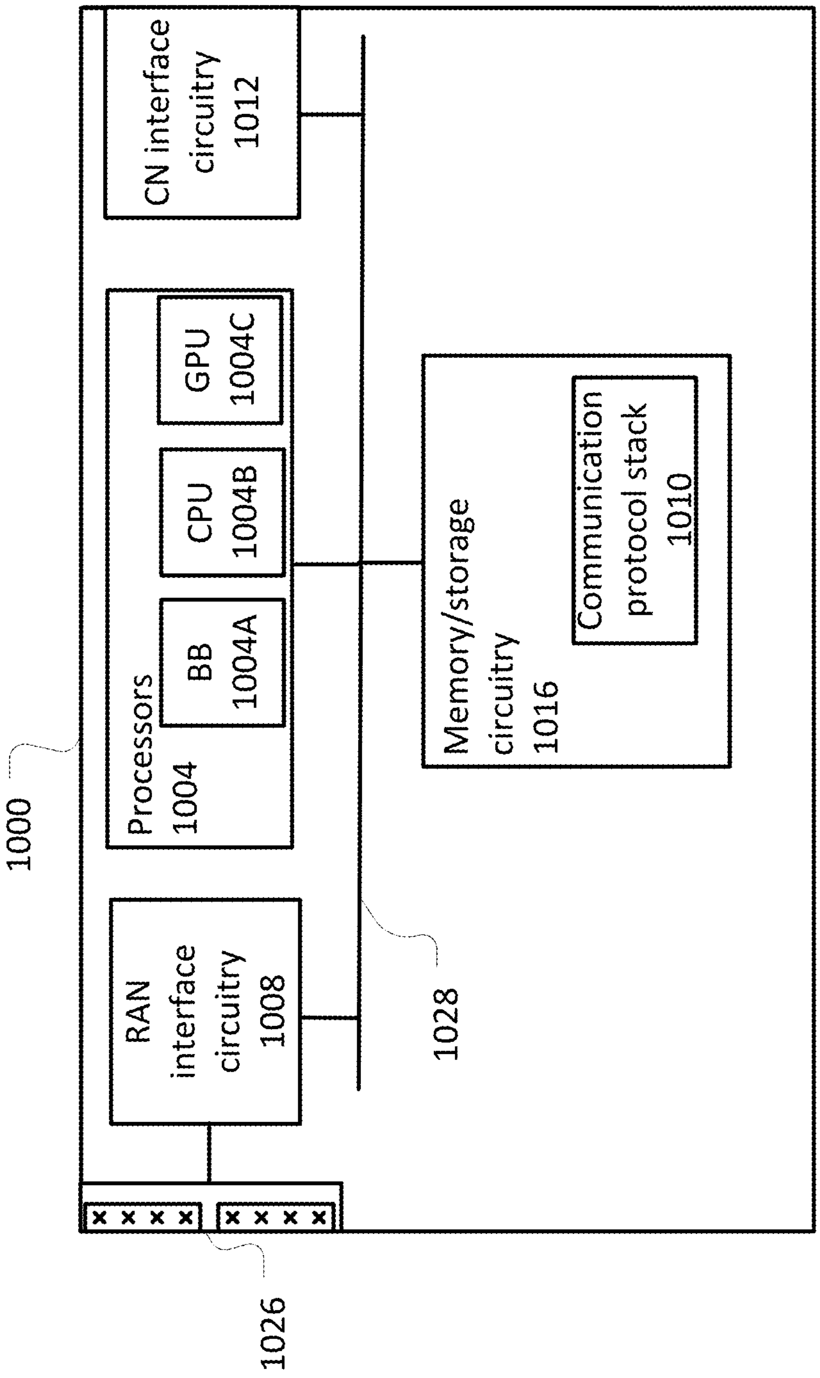
FIG. 10 illustrates an example next generation nodeB (gNB) in accordance with some embodiments.

The system arrangement 100 may include a network arrangement, or some portion thereof. The system arrangement may include one or more base stations, one or more core networks (such as the core network 202 (FIG. 2)), other elements known to be included in third generation partnership project (3GPP) networks by one having ordinary skill in the art, or some combination thereof. In the illustrated embodiment, the network arrangement includes a first base station 102, a second base station 104, and a third base station 106. Each of the first base station 102, the second base station 104, and the third base station 106 may be a nodeB, an evolved nodeB (eNB), and/or a next generation nodeB (gNB). For example, each of the first base station 102, the second base station 104, and the third base station 106 may include one or more of the features of the gNB 1000 (FIG. 10).

Each of the base stations may host one or more cells. In the illustrated embodiment, the first base station 102 hosts a first cell 108, the second base station 104 hosts a second cell 110, and the third base station 106 hosts a third cell 112.

Each of the base stations may provide services of the network to UEs located within the corresponding cell. For example, the first base station 102 may provide services of the network to UEs located within the first cell 108, the second base station 104 may provide services of the network to UEs located within the second cell 110, and the third base station 106 may provide services of the network to UEs located within the third cell 112. The cells may overlap, where the UEs within the overlapping portions of the cells may receive services from one or more of the base stations that host the cells.

Figure 9:
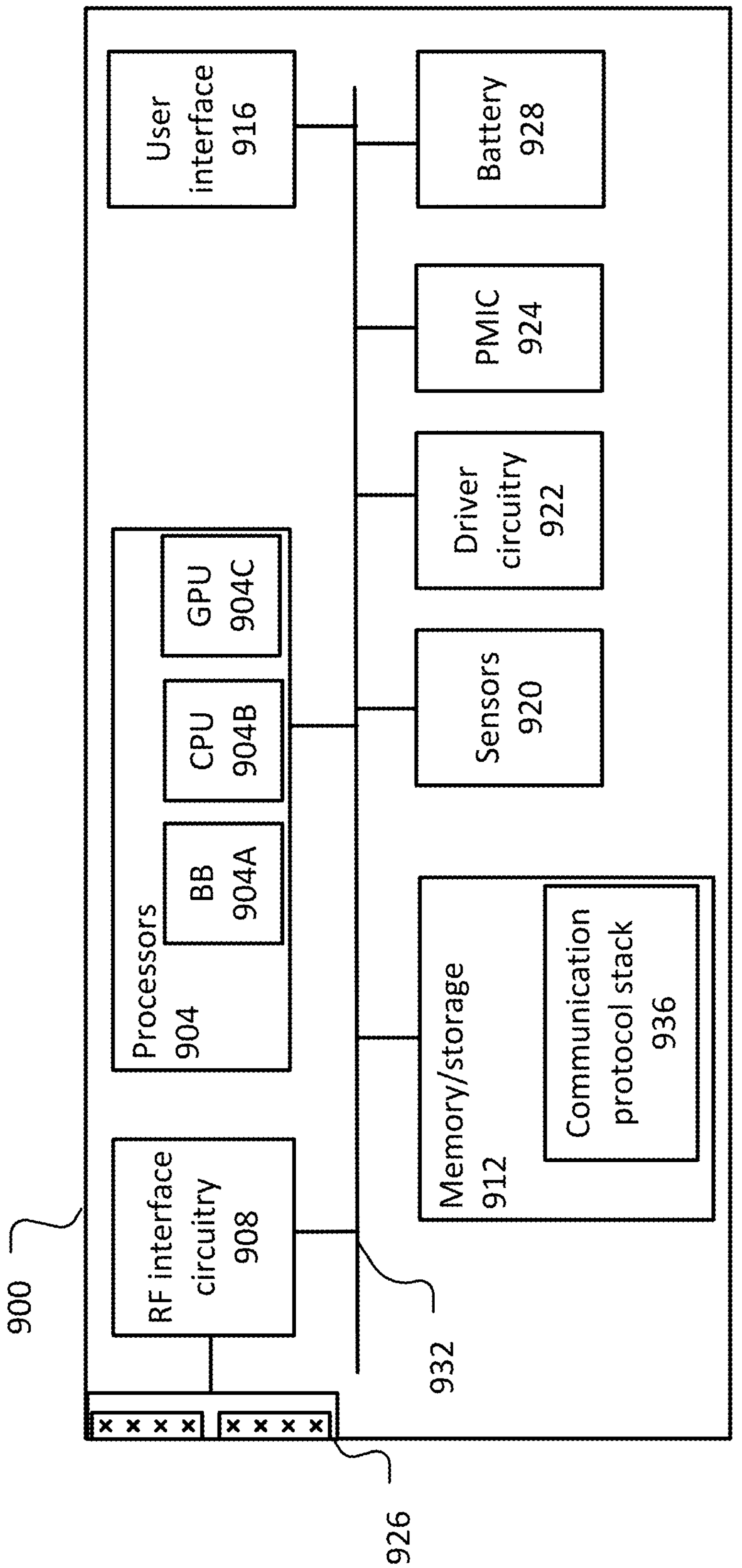
FIG. 9 illustrates an example user equipment (UE) in accordance with some embodiments.

The system arrangement 100 may include one or more UEs. In the illustrated embodiment, the system arrangement 100 includes a UE 114. The UE 114 may include one or more of the features of the UE 900 (FIG. 9). UEs located within overlapping cells may establish connections with one or more of the base stations hosting the overlapping cells. For example, the UE 114 is located within the first cell 108, the second cell 110, and the third cell 112 in the illustrated embodiment. The UE 114 may establish a connection with the first base station 102 hosting the first cell 108, the second base station 104 hosting the second cell 110, and/or the third base station 106 hosting the third cell 112.

The UEs in the overlapping cells may initially connect with a host of a first cell, such as through radio resource control signaling. The first cell with which a UE initially connects may be referred to as a primary cell (PCell). The UEs in the overlapping cells may then connect with hosts of one or more other cells that can provide additional resources to the UEs. These other cells to which the UEs connect may be referred to as secondary cells (SCells). For example, the UE 114 may establish a connection with the first base station 102 hosting the first cell 108, where the first cell 108 may be a PCell for the UE 114. Further, the UE 114 may establish connections with the second base station 104 hosting the second cell 110 and/or the third base station 106 hosting the third cell 112, where the second cell 110 and/or the third cell 112 may be SCells for the UE 114.

Figure 2:
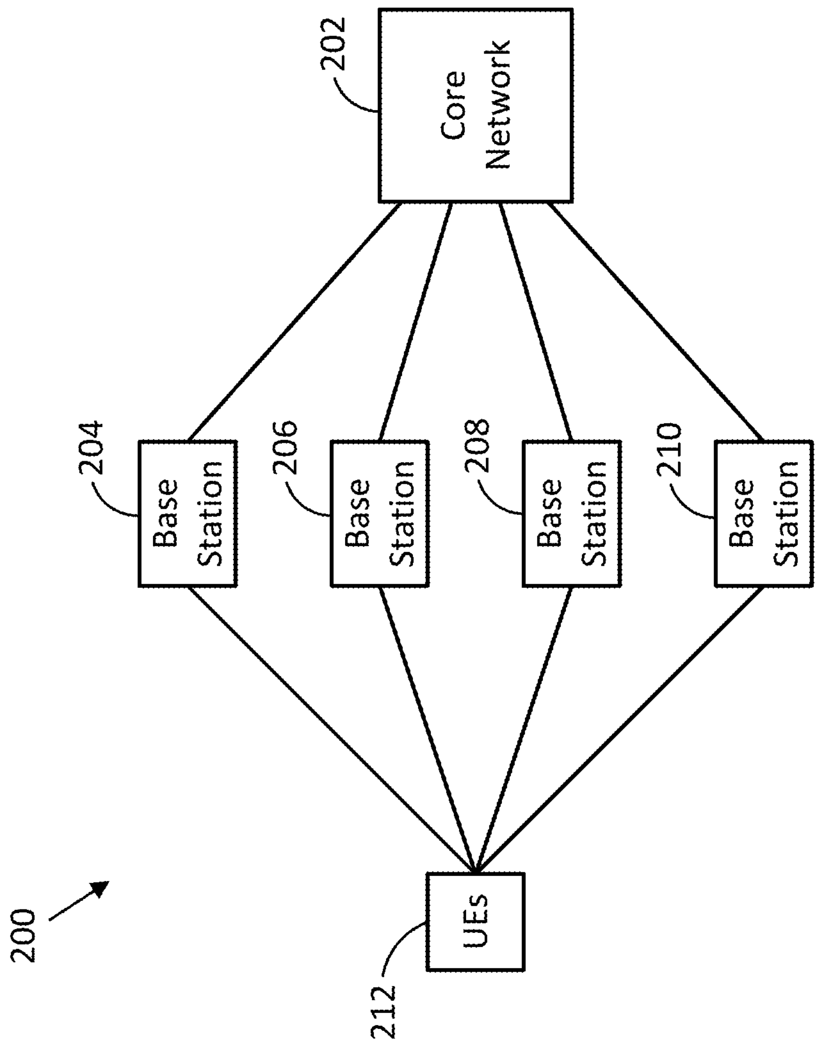
FIG. 2 illustrates another example system arrangement in accordance with some embodiments.

FIG. 2 illustrates another example system arrangement 200 in accordance with some embodiments. For example, the illustrated system arrangement 200 may implement one or more of the approaches described throughout this disclosure.

The system arrangement 200 may include a network arrangement, or some portion thereof. For example, the system arrangement may include one or more base stations, one or more core networks, other elements known to be included in 3GPP networks by one having ordinary skill in the art, or some combination thereof. In the illustrated embodiment, the network arrangement includes a core network (CN) 202. The CN 202 may provide services to UEs, such as voice and/or data services. Further, the core network 202 may control one or more other elements of the network arrangement and/or operate in combination with one or more other elements of the network arrangement to provide the services to the UEs.

In the illustrated embodiment, the network arrangement may include a first base station 204, a second base station 206, a third base station 208, and a fourth base station 210. Each of the first base station 204, the second base station 206, the third base station 208, and the fourth base station 210 may include one or more of the features of the first base station 102 (FIG. 1), the second base station 104 (FIG. 1), the third base station 106 (FIG. 1), and/or the gNB 1000 (FIG. 10). Further, each of the first base station 204, the second base station 206, the third base station 208, and the fourth base station 210 are coupled to the CN 202. In some embodiments, the CN 202 may control one or more of the operations of the first base station 204, the second base station 206, the third base station 208, and/or the fourth base station 210. The first base station 204, the second base station 206, the third base station 208, and/or the fourth base station 210 may be able to access one or more of the services provided by the CN 202 and may be utilized by UEs to access the services provided by the CN 202. Each of the first base station 204, the second base station 206, the third base station 208, and the fourth base station 210 may host one or more cells, such as the first cell 108 (FIG. 1), the second cell 110 (FIG. 1), and/or the third cell 112 (FIG. 1).

The system arrangement 200 may include one or more UEs 212. The one or more UEs 212 may include one or more features of the UE 114 (FIG. 1) and/or the UE 900 (FIG. 9). The UEs 212 may establish connections with one or more of the first base station 204, the second base station 206, the third base station 208, and/or the fourth base station 210 to obtain services from the network arrangement, including the CN 202. In some embodiments, one or more of the UEs 212 may utilize one of the cells hosted by the first base station 204, the second base station 206, the third base station 208, or the fourth base station 210 as a PCell and one or more of the cells hosted by the first base station 204, the second base station 206, the third base station 208, and/or the fourth base station 210 as SCells. One or more of the SCells can be configured to omit SSB transmissions as described throughout this disclosure. Further, one or more of the UEs can be configured to perform L1 measurements to determine L1 measurement values for the cells as described further throughout this disclosure.

In legacy approaches, the SCells were required to transmit SSBs to be utilized by the UEs for L1 measurements. The transmissions of the SSBs, and maintaining the resources (such as antennas) for transmitting the SSBs in an on state, uses energy. Approaches described herein may allow the SCells to mute SSB transmissions, which can save energy. For example, muting the SSB transmissions may include not transmitting the SSBs and/or turning off the resources for transmitting the SSBs. The SCells that have the SSB transmissions muted may be referred to as SSB-less SCells.

Figure 3:
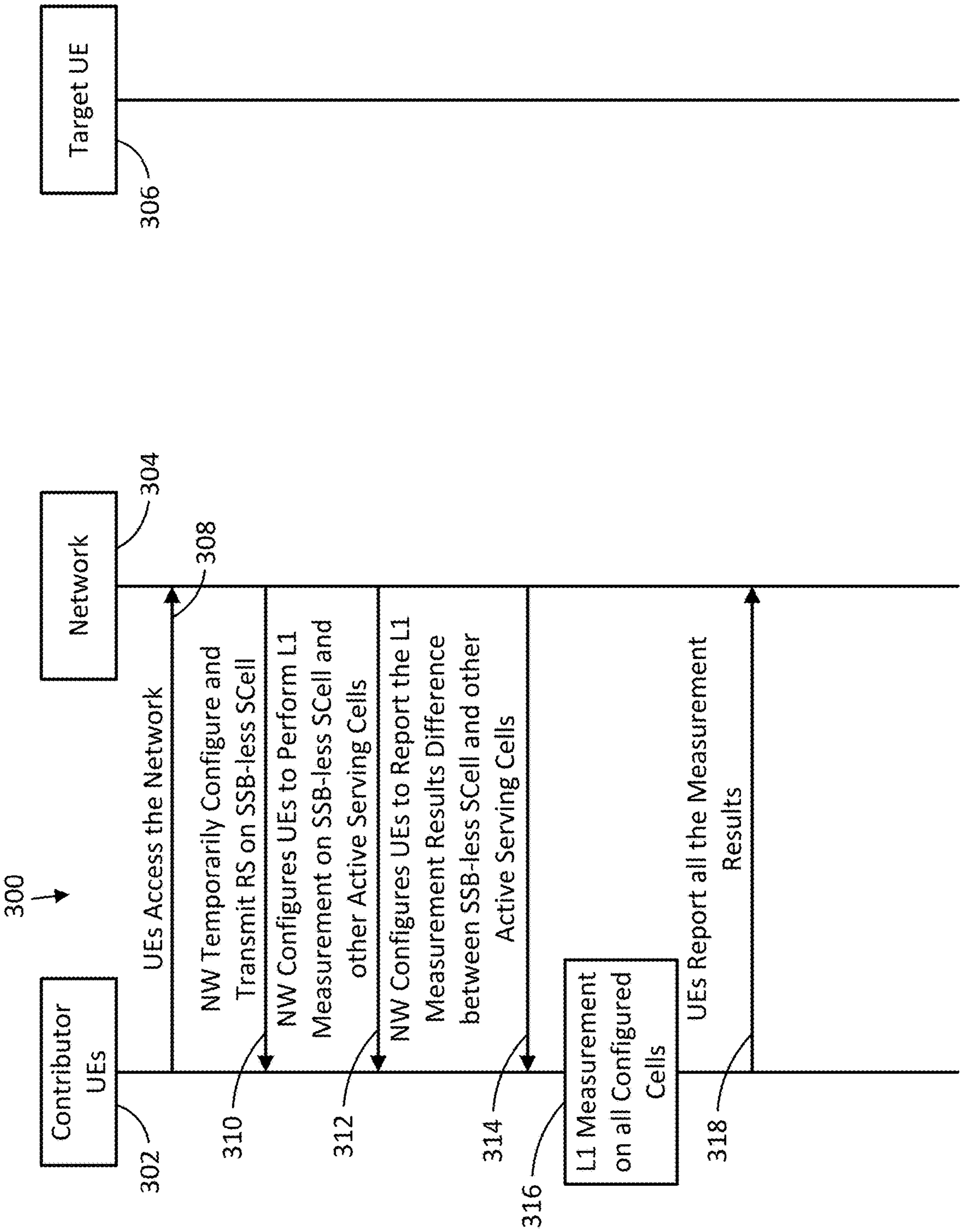
FIG. 3 illustrates a first portion of an example signaling chart for configuring n synchronization signal block (SSB)-less secondary cell (SCell) in accordance with some embodiments.
Figure 4:
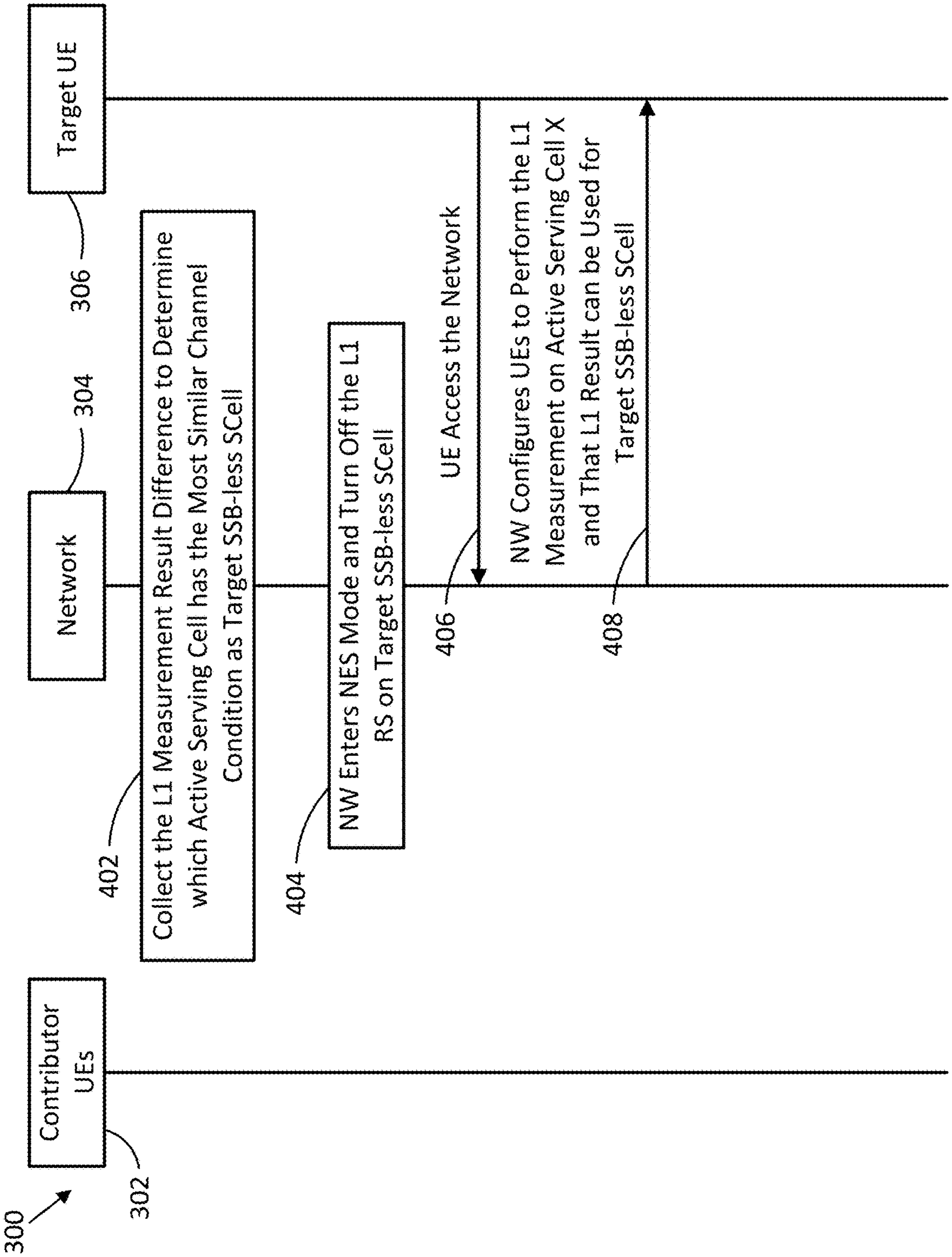
FIG. 4 illustrates a second portion of the example signaling chart for configuring the SSB-less SCell in accordance with some embodiments.

FIG. 3 illustrates a first portion of an example signaling chart 300 for configuring an SSB-less SCell in accordance with some embodiments. FIG. 4 illustrates a second portion of the example signaling chart 300 for configuring the SSB-less SCell in accordance with some embodiments. For example, the signaling chart 300 illustrates signals that may be exchanged and operations that may be performed for configuration of an SSB-less SCell.

The signaling chart 300 may include one or more contributor UEs 302. The contributor UEs 302 may include one or more of the features of the UE 114 (FIG. 1), the UEs 212 (FIG. 2), and/or the UE 900 (FIG. 9). In some embodiments, the contributor UEs 302 may be located within a defined area.

The signaling chart 300 may include a network 304. The network 304 may include one or more of the features of the network arrangement described in relation to FIG. 1 and/or one or more of the features of the network arrangement described in relation to FIG. 2. For example, the network 304 may include one or more base stations and one or more CNs. Each of the one or more base stations may include one or more of the features of the first base station 102 (FIG. 1), the second base station 104 (FIG. 1), the third base station 106 (FIG. 1), the first base station 204 (FIG. 2), the second base station 206 (FIG. 2), the third base station 208 (FIG. 2), the fourth base station 210 (FIG. 2), and/or the gNB 1000

(FIG. 10). Each of the one or more CNs may include one or more of the features of the CN 202 (FIG. 2).

The signaling chart 300 may include a target UE 306. The target UE 306 may include one or more of the features of the UE 114 (FIG. 1), the UEs 212 (FIG. 2), and/or the UE 900 (FIG. 9). In some embodiments, the target UE 306 may be included in the contributor UEs 302, where one or more of the signals exchanged by the contributor UEs 302 and/or one or more of the operations performed by the contributor UEs 302 may be exchanged and/or performed by the target UE 306.

The contributor UEs 302 may access the network 304 in 308. For example, the contributor UEs 302 may exchange communications with the network 304 to access the network 304. The exchanging of communications with the network 304 may result in the contributor UEs 302 being registered with the network 304 and/or being able to access services of the network 304. In some embodiments, the target UE 306 may be included in the contributor UEs 302 when accessing the network in 308.

In order to not configure RS for L1 measurement on the target SSB-less SCell, if the network won't configure the RS for L1 measurement on SSB-less SCell, the network may temporarily configure and transmit RS on the SSB-less SCell. The RS can be CSI-RS or SSB. For example, the network may configure a base station of an SSB-less SCell to temporarily transmit a RS. The RS to be temporarily transmitted may include a CSI-RS or an SSB. The temporary transmission of the RS may be part of a procedure for determining whether the SSB-less SCell can omit SSB transmissions while still having UEs effectively determine an L1 measurement value for the SSB-less SCell and/or for determining an active serving cell that can facilitate a determination of the L1 measurement value for the SSB-less SCell.

For example, the network 304 may temporarily configure and transmit an RS on an SSB-less SCell in 310. For example, the network 304 may configure a base station of the network 304 corresponding to a target SSB-less SCell to temporarily transmit an RS within the target SSB-less SCell. The target SSB-less SCell may include one or more of the features of the first cell 108 (FIG. 1), the second cell 110 (FIG. 1), and/or the third cell 112 (FIG. 1). The network 304 may configure the base station to transmit the RS for a certain period of time, a certain number of transmissions, or until the base station is reconfigured to omit transmission of the RS. In some embodiments, the CN of the network 304 may configure the base station.

Network may configure multiple UEs to perform the L1 measurement on those L1 RSs and also to perform the L1 measurement on other active serving cells. For example, the network may configure two or more UEs to perform an L1 measurement on the RS configured to be temporarily transmitted by the SSB-less SCell. Further, the network may configure the UEs to perform one or more L1 measurements on one or more other active serving cells.

For example, the network 304 may configure the contributor UEs 302 to perform L1 measurement on the SSB-less SCell and other active serving cells in 312. For example, the network 304 may configure the contributor UEs 302 to perform an L1 measurement with the RS temporarily transmitted by the base station within the target SSB-less SCell. Further, the network 304 may configure the contributor UEs 302 to perform one or more L1 measurements with RSs transmitted within other active serving cells that can provide services to the contributor UEs 302. The contributors UEs 302 may produce L1 measurement results for the target SSB-less SCell and the other active serving cells based on the L1 measurements.

Network may configure UEs to report the L1 measurement result difference between target SSB-less SCell and other active serving cells. For example, the network 304 may configure the contributor UEs 302 to report the L1 measurement results difference between the SSB-less SCell and the other active serving cells in 314. The network 304 may configure each of the contributor UEs 302 to report the L1 measurement results for the target SSB-less SCell and the other active serving cells, may configure each of the contributor UEs 302 to determine result differences between the L1 measurement result for the target SSB-less SCell and the L1 measurement results for the other active serving cells and report result differences, or some combination thereof.

The contributor UEs 302 may perform L1 measurement on all configured cells in 316. From UE perspective, based on network configuration, UE may measure and report the delta L1-RSRP or delta L1-SINR or channel quality between active serving cell and SSB-less SCell. In particular, the contributor UEs 302 may perform one or more L1 measurements on the cells configured in 314. For example, the contributor UEs 302 may perform L1 measurements on the target SSB-less SCell and the active serving cells. The L1 measurements may include L1-RSRP, L1-SINR, and/or channel quality measurements. The contributor UEs 302 may produce L1 measurement results from the L1 measurements on the target SSB-less SCell and the active serving cells. In some embodiments, the L1 measurement results may include indications of channel conditions and/or channel quality. In instances where one or more of the contributor UEs 302 are configured to report the result differences, the one or more of the contributor UEs 302 may compare the L1 measurement results for the target SSB-less SCell with the L1 measurement results for the other active serving cells to produce result differences between the target SSB-less SCell and the other active serving cells. The result differences may include differences between L1-RSRP (which may be referred to as "delta L1-RSRP"), differences between L1-SINR (which may be referred to as "delta L1-SINR"), and/or differences between channel quality.

Network may collect the L1 measurement result difference between target SSB-less SCell and other active serving cells (channel condition/quality between SSB-less SCell and other active serving cell) to determine which active serving cell has the most similar channel condition as target SSB-less SCell, e.g., active serving cell X. For example, the contributor UEs 302 may report all measurement results to the network 304 in 318. The measurement results may comprise the L1 measurement results and/or the result differences.

The network 304 may collect the L1 measurement result difference to determine which active serving cell has the most similar channel condition as the target SSB-less SCell in 402. The network 304 may collect the L1 measurement results and/or the result differences transmitted by the contributor UEs 302. The network 304 may determine the L1 measurement result differences between the SSB-less SCell and the other active serving cells based on the L1 measurement results and/or the result differences received from the contributor UEs 302. In some embodiments, the L1 measure result differences may include an indication of channel condition and/or channel quality differences between the target SSB-less SCell and each of the other active serving cells.

The network 304 may compare the L1 measurement result differences for corresponding to each of the active serving cells to determine which active serving cell has the most similar channel conditions to the target SSB-less SCell. In particular, the network 304 may determine which active serving cell has the most similar channel conditions to the target SSB-less SCell based on which active serving cell corresponds to the smallest L1 measurement result difference. The active serving cell with the most similar channel conditions may be referred to as serving cell X herein.

In some embodiments, the network 304 may determine whether the L1 measurement result difference is less than a threshold value. For example, the network 304 may determine whether the L1 measurement result for the serving cell X is within the threshold value of the L1 measurement result for the target SSB-less SCell. If the L1 measurement result difference is greater than the threshold value, the network 304 may determine that L1 measurements of the serving cell X is not an adequate substitute for L1 measurement of the target SSB-less SCell and, therefore, the SSB cannot be muted for the SSB-less SCell based on no other active serving cells having enough channel conditions. If the L1 measurement result difference is less than or equal to the threshold value, the network 304 may determine that L1 measurements of the serving cell X is an adequate substitute for L1 measurement of the target SSB-less SCell and, therefore, the SSB can be muted for the SSB-less SCell.

The network 304 may enter an NES mode and turn off the L1 RS on the target SSB-less SCell in 404. For example, the network 304 may configure a base station that hosts the target SSB-less SCell to omit an L1 RS for the target SSB-less SCell. In some embodiments, the L1 RS may comprise an SSB.

In some embodiments, the target UE 306 may access the network in 406. For example, the target UE 306 may exchange communications with the network 304 to access the network 304. The exchanging of communications with the network 304 may result in the target UE 306 being registered with the network 304 and/or being able to access services of the network 304.

Network can indicate UE to use the L1 measurement result of serving cell X for target SSB-less SCell, and network may mute the RS for L1 measurement on the target SSB-less SCell. No configuration of L1 measurement on the target SSB-less SCell. For example, the network 304 may configure UEs (including the target UE 306) to perform the L1 measurement on active serving cell X and that L1 result can be used for the target SSB-less SCell in 408. In particular, the network 304 may configure the target UE 306 to perform L1 measurements on the serving cell X to produce L1 measurement results for the serving cell X. Further, the network 304 may configure the target UE 306 to determine L1 measurement values for the target SSB-less SCell based on the L1 measurement results for the serving cell X. The target UE 306 may then perform L1 measurements for the target SSB-less SCell and utilize the L1 measurements to determine L1 measurement values for the SSB-less SCell.

If RS for L1 measurement is not configured on target SSB-less SCell, a few options may be utilized by the UEs for performing L1 measurements. In a first option, (which may be referred to as "Option 1"), for BFD and L1-SINR measurement, UE may need to calculate the RSRP and interference power. For example, BFD and/or L1-SINR measurement values may be determined based on RSRP values and interference power.

The SINR may be based on a measurement result of CMR (channel measurement resource) on an active serving cell, and a measurement result of IMR (interference measurement resource) may or may not on the SSB-less SCell. For example, an SINR value may be determined based on a measurement result of a CMR on an active serving cell and a measurement result of an IMR on the SSB-less SCell or the active serving cell.

Both BFD and L1-SINR may receive CMR and IMR configurations from network for the SINR measurement. For example, a network (such as the network 304) may configure one or more UEs (such as the target UE 306) with CMR and IMR configurations. The CMR configurations and IMR configuration may be utilized for BFD and L1-SINR. CMR can be configured on an active serving cell, and it can be SSB or CSI-RS. For example, the network can configure the UEs to utilize a CMR of an active serving cell (such as the serving cell X) for performing channel measurements. In some embodiments, the CMR may be an SSB or a CSI-RS. IMR can be a ZP-CSI-RS configured on SSB-less SCell, and it may only indicate the time/frequency position to measure the interference (the real CSI-RS is not transmitted from network on SSB-less SCell); or IMR can be RSSI measurement symbol position on the SSB-less SCell. For example, the network can configure the UEs to utilize an IMR of the SSB-less SCell for performing interference measurements. In some embodiments, the IMR may be a ZP-CSI-RS of the SSB-less SCell. In these embodiments, the IMR may indicate a time position and a frequency position to measure the interference. In some embodiments, the IMR may be an RSSI measurement symbol position of the SSB-less SCell.

In a second option (which may be referred to as "Option 2"), if scenario 1 is deployed, network may configure UE to use TRS for L1 measurement, e.g., TRS can be CSI-RS. For example, in the second option, the SSB-less SCell may be configured without SSB transmission and with TRS transmission. In particular, a base station hosting the SSB-less SCell may be configured to omit SSB transmissions and provide TRS transmissions for the SSB-less SCell.

In a first group of the second option (which may be referred to as "Option 2-1"), timing tracking and L1 measurement may both be based on the best beam. For example, UE beam sweeping may not be allowed on this TRS (up to network configuration whether beam sweeping is needed or not). The UE may be configured to perform both timing tracking and L1 measurement on a best beam carrying the TRS.

In a second group of the second option (which may be referred to as "Option 2-2"), L1 measurement may be performed on partial TRS occasions, and timing tracking may be performed on other TRS occasions, e.g., X out of Z TRS occasions may be used for L1 measurement, and UE may or may not use reception (Rx) beam sweeping for L1 measurement based on network configuration. Y out of Z TRS occasion may be used for timing tracking, and UE may not use Rx beam sweeping for timing tracking. X+Y=Z. For example, the UE may be configured to use a first portion of TRS occasions of the SSB-less SCell for L1 measurement and a second portion of TRS occasions of the SSB-less SCell for timing tracking. The first portion of TRS occasions and the second portion of TRS occasions together may include the TRS occasions transmitted on the SSB-less SCell. The UE may be configured to use Rx beam sweeping for L1 measurement in some instances and may be configured not to use Rx beam sweeping for L1 measurement in other instances. The UE may be configured to not use Rx beam sweeping for timing tracking.

Figure 5:
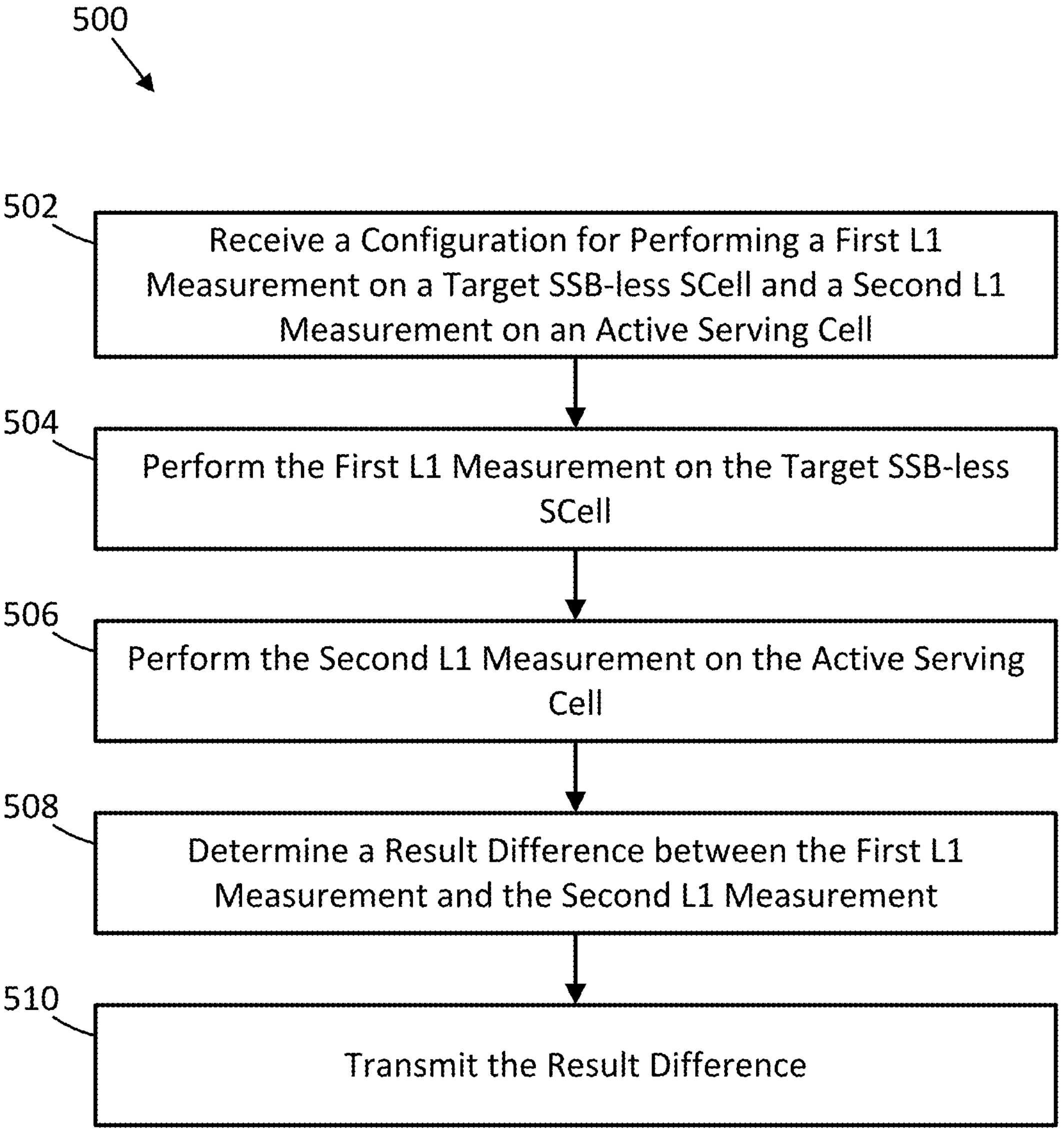
FIG. 5 illustrates an example procedure for configuration an SSB-less SCell in accordance with some embodiments.

FIG. 5 illustrates an example procedure 500 for configuration an SSB-less SCell in accordance with some embodiments. For example, a UE may perform the procedure 500 as part of a configuration of an SSB-less SCell. The UE may include one or more of the features of the UE 114 (FIG. 1), the UEs 212 (FIG. 2), the contributor UEs 302 (FIG. 3), the target UE 306 (FIG. 3), and/or the UE 900 (FIG. 9).

The procedure 500 may include receiving a configuration for performing a first L1 measurement on a target SSB-less SCell and a second L1 measurement on an active serving cell in 502. For example, the UE may receive, from a base station, a configuration for performing a first L1 measurement on a target SSB-less SCell and a second L1 measurement on an active serving cell. The base station may include one or more of the features of the first base station 102 (FIG. 1), the second base station 104 (FIG. 1), the third base station 106 (FIG. 1), the first base station 204 (FIG. 2), the second base station 206 (FIG. 2), the third base station 208 (FIG. 2), the fourth base station 210 (FIG. 2), and/or the gNB 1000 (FIG. 10). For example, the configuration for performing the L1 measurements may include one or more of the features of the configuration in 312 (FIG. 3).

The procedure 500 may include performing the first L1 measurement on the target SSB-less SCell in 504. For example, the UE may perform the first L1 measurement on the target SSB-less SCell. Performing the first L1 measurement may include one or more of the features of the performance of an L1 measurement on a target SSB-less SCell in 316 (FIG. 3). In some embodiments, the first L1 measurement may be performed with a CSI-RS or an SSB transmitted by the target SSB-less SCell.

The procedure 500 may include performing the second L1 measurement on the active serving cell. For example, the UE may perform the second L1 measurement on the active serving cell. Performing the second L1 measurement may include one or more of the features of the performance of an L1 measurement on an active serving cell in 316.

The procedure 500 may include determining a result difference between the first L1 measurement and the second L1 measurement in 506. For example, the UE may determine a result difference between the first L1 measurement and the second L1 measurement. Determining the result difference may include one or more of the features of determining the result differences in 316. In some embodiments, the result difference may include an L1-RSRP difference between the first L1 measurement and the second L1 measurement, an L1-SINR difference between the first L1 measurement and the second L1 measurement, or a channel quality difference between the first L1 measurement and the second L1 measurement.

The procedure 500 may include transmitting the result difference in 510. For example, the UE may transmit, to the base station, the result difference. The transmission of the result difference may include one or more of the features of reporting the measurement results in 318 (FIG. 3).

In some embodiments, the procedure 500 may include receiving an indication to utilize further L1 measurement results of the active serving cell to determine L1 measurement values for the target SSB-less SCell. For example, the UE may receive, from the base station an indication to utilize further L1 measurement results of the active serving cell to determine L1 measurement values for the target SSB-less SCell. The indication to utilize the further L1 measurement results may include one or more of the features of the configuration in 408 (FIG. 4). In some embodiments, receiving the indication may be omitted.

In some embodiments, the procedure 500 may include performing L1 measurements on the active serving cell after the second L1 measurement to determine the L1 measurement results of the active serving cell. For example, the UE may perform L1 measurements on the active serving cell after the second L1 measurement to determine the L1 measurement results of the active serving cell. In some embodiments, performing the L1 measurements on the active serving cell after the second L1 measurement may be omitted.

In some embodiments, the procedure 500 may include determining L1 measurement values for the target SSB-less SCell. For example, the UE may determine L1 measurement values for the target SSB-less SCell based at least in part on the L1 measurement results of the active serving cell. In some embodiments, determining the L1 measurement values may be omitted.

In some embodiments, the procedure 500 may include receiving an RSRP configuration. For example, the UE may receive, from the base station, an RSRP configuration. The RSRP configuration may indicate a CMR of the active serving cell or an IMR of the target SSB-less SCell. In some embodiments, the CMR may include an SSB or a CSI-RS. Further, the IMR may include a ZP-CSI-RS or an RSSI measurement symbol position in some embodiments. In some embodiments, receiving the RSRP configuration may be omitted.

In some embodiments, the procedure 500 may include performing a measurement of the CMR to produce a first measurement result. For example, the UE may perform a measurement of the CMR to produce the first measurement result. The CMR may be the CMR indicated in an RSRP configuration. In some embodiments, performing the measurement of the CMR may be omitted.

In some embodiments, the procedure 500 may include performing a measurement of the IMR to produce a second measurement result. For example, the UE may perform a measurement of the IMR to produce the second measurement result. The IMR may be the IMR indicated in an RSRP configuration. In some embodiments, performing the measurement of the IMR may be omitted.

In some embodiments, the procedure 500 may include determining an SINR. For example, the UE may determine an SINR based at least in part on the first measurement result of the CMR and the second measurement result of the IMR. In some embodiments, determining the SINR may be omitted.

In some embodiments, the procedure 500 may include receiving an L1 measurement configuration. For example, the UE may receive, from the base station, an L1 measurement configuration. The L1 measurement configuration may indicate a TRS of the target SSB-less SCell. In these embodiments, the procedure 500 may include performing an L1 measurement using the TRS. For example, UE may perform an L1 measurement using the TRS. In some embodiments, one or both of the receiving the L1 measurement configuration and the performing the L1 measurement using the TRS may be omitted.

In some of the embodiments where the L1 measurement configuration is received, the L1 measurement configuration may indicate that the UE is to utilize a first portion of TRS occasions for L1 measurements and a second portion of the TRS occasions for timing tracking. In these embodiments, performing the L1 measurement on a first TRS occasion from the first portion of the TRS occasions. In some of these embodiments, the procedure 500 may include performing a timing tracking measurements on a second TRS occasion from the second portion of the TRS occasions. For example, the UE may perform timing tracking measurements on a second TRS occasion from the second portion of the TRS occasions. In some embodiments, one or both of the indication and the timing tracking measurements on the second TRS occasion may be omitted.

While FIG. 5, arguably, implies an order of the operations of the procedure 500, it should be understood that the operations may be performed in a different order and/or one or more of the operations may be performed concurrently in other embodiments. Further, one or more of the operations of the procedure 500 may be omitted and/or one or more additional operations may be added to the procedure 500 in other embodiments.

Figure 6:
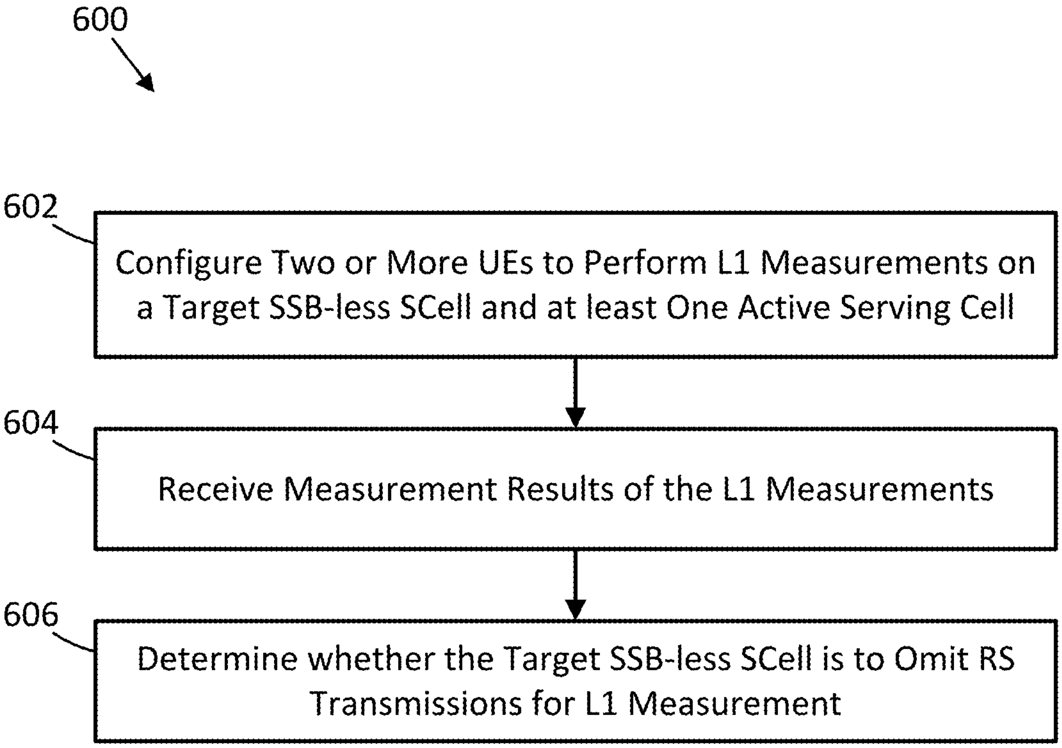
FIG. 6 illustrates an example procedure for configuration an SSB-less SCell in accordance with some embodiments.

FIG. 6 illustrates an example procedure 600 for configuration an SSB-less SCell in accordance with some embodiments. For example, a network arrangement may perform the procedure 600 as part of a configuration of an SSB-less SCell. The network arrangement may include one or more of the features of the network arrangement described in relation to FIG. 1, the network arrangement described in relation to FIG. 2, and/or the network 304 (FIG. 3). For example, the network arrangement may include a core network (such as the core network 202 (FIG. 2)) and/or or one or more base stations (such as the first base station 102 (FIG. 1), the second base station 104 (FIG. 1), the third base station 106 (FIG. 1), the first base station 204 (FIG. 2), the second base station 206 (FIG. 2), the third base station 208 (FIG. 2), the fourth base station 210 (FIG. 2), and/or the gNB 1000 (FIG. 10)).

The procedure 600 may include configuring two or more UEs to perform L1 measurements on a target SSB-less SCell and at least one active serving cell in 602. For example, the network arrangement may configure two or more UEs to perform L1 measurements on a target SSB-less SCell and at least one active serving cell. The configuring of the two or more UEs to perform L1 measurements may include one or more of the features of the configuring in 312 (FIG. 3).

The procedure 600 may include receiving measurement results of the L1 measurements in 604. For example, the network arrangement may receive, from the two or more UEs, measurement results of the L1 measurements.

The procedure 600 may include determining whether the target SSB-less SCell is to omit RS transmissions for L1 measurement in 606. For example, the network arrangement may determine whether the target SSB-less SCell is to omit RS transmissions for L1 measurement based at least in part on the measurement results.

In some embodiments, determining whether the target SSB-less SCell is to omit the RS transmissions includes determining whether the first measurements from an active serving cell from the at least one active serving are within a threshold of second measurements from the target SSB-less SCell based at least in part on the measurement results. For example, the network arrangement may determine whether first measurements from an active serving cell from the at least one active serving cell are within a threshold of second measurements from the target SSB-less SCell based at least in part on the measurement results. For example, the determining whether the first measurements are within the threshold of the second measurements may include one or more of the features of determining whether the L1 measurement result difference is within the threshold value in 402. In some embodiments, determining whether the first measurements are within the threshold of the second measurements may be omitted.

In some embodiments, the first measurements from the active serving cell may be determined to be within the threshold of the second measurements from the target SSB-less SCell. In these embodiments, the procedure 600 may further include configuring the target SSB-less SCell to omit the RS transmissions. For example, the network arrangement may configure the target SSB-less SCell to omit the RS transmissions based at least in part on the determination that the first measurements are within the threshold of the second measurements. In some embodiments, configuring the target SSB-less SCell to omit the RS transmissions may be omitted.

In some embodiments, determining whether the target SSB-less SCell is to omit the RS transmissions may include determining that the target SSB-less SCell is to omit RS transmissions. In these embodiments, the procedure 600 may include configuring a UE to utilize L1 measurement results of an active serving cell from the at least one active serving cell to determine L1 measurement values for the target SSB-less SCell. For example, the network arrangement may configure a UE to utilize L1 measurement results of an active serving cell from the at least one active serving cell to determine L1 measurement values for the target SSB-less SCell based at least in part on the determination that the target SSB-less SCell is to omit the RS transmissions. The UE may include one or more of the features of the UE 114 (FIG. 1), the UEs 212 (FIG. 2), the contributor UEs 302 (FIG. 3), the target UE 306 (FIG. 3), and/or the UE 900 (FIG. 9). Configuring the UE to utilize L1 measurement results of an active serving cell to determine L1 measurement values includes one or more of the features of the configuring in 408. In some embodiments, configuring the UE to utilize the L1 measurement results of the active serving cell to determine the L1 measurement values may be omitted.

In some embodiments, determining whether the target SSB-less SCell is to omit the RS transmissions may include determining that the SSB-less SCell is to omit the RS transmissions. In these embodiments, the procedure 600 may include configuring a UE to utilize a CMR of an active serving cell from the at least one active serving cell to perform channel measurements based at least in part on the determination that the target SSB-less SCell is to omit the RS transmissions. Further, the procedure 600 may include configuring the UE to utilize an IMR of the target SSB-less SCell to perform interference measurements based at least in part on the determination that the target SSB-less SCell is to omit the RS transmissions. In some embodiments, configuring the UE to utilize the CMR and configuring the UE to utilize the IMR may be omitted.

In some embodiments where the UE is configured to utilize the CMR and the IMR, the CMR may include an SSB or a CSI-RS. Further, the IMR may include a ZP-CSI-RS or an RSSI measurement symbol position.

In some embodiments, determining whether the target SSB-less SCell is to omit the RS transmissions includes determining that the target SSB-less SCell is to omit the RS transmissions. In these embodiments, the procedure 600 may include configuring a UE to utilize a TRS of the target SSB-less SCell for one or more L1 measurements of the target SSB-less SCell. For example, the network arrangement may configure a UE to utilize a TRS of the target SSB-less SCell for one or more L1 measurements of the target SSB-less SCell based at least in part on the determination that the target SSB-less SCell is to omit the RS transmissions. In some embodiments, configuring the UE to utilize the TRS may be omitted.

In some embodiments, determining whether the target SSB-less SCell is to omit the RS transmissions may include determining that the target SSB-less SCell is to omit the RS transmissions. In these embodiments, the procedure 600 may include configuring a UE to utilize a first portion of TRS occasions of the target SSB-less SCell for one or more L1 measurements of the target SSB-less SCell based at least in part on the determination that the target SSB-less SCell is to omit the RS transmissions. Further, the procedure 600 may include configuring the UE to utilize a second portion of the TRS occasions of the target SSB-less SCell for one or more timing tracking measurements of the target SSB-less SCell based at least in part on the determination that the target SSB-less SCell is to omit the RS transmissions.

While FIG. 6, arguably, implies an order of the operations of the procedure 600, it should be understood that the operations may be performed in a different order and/or one or more of the operations may be performed concurrently in other embodiments. Further, one or more of the operations of the procedure 600 may be omitted and/or one or more additional operations may be added to the procedure 600 in other embodiments.

Figure 7:
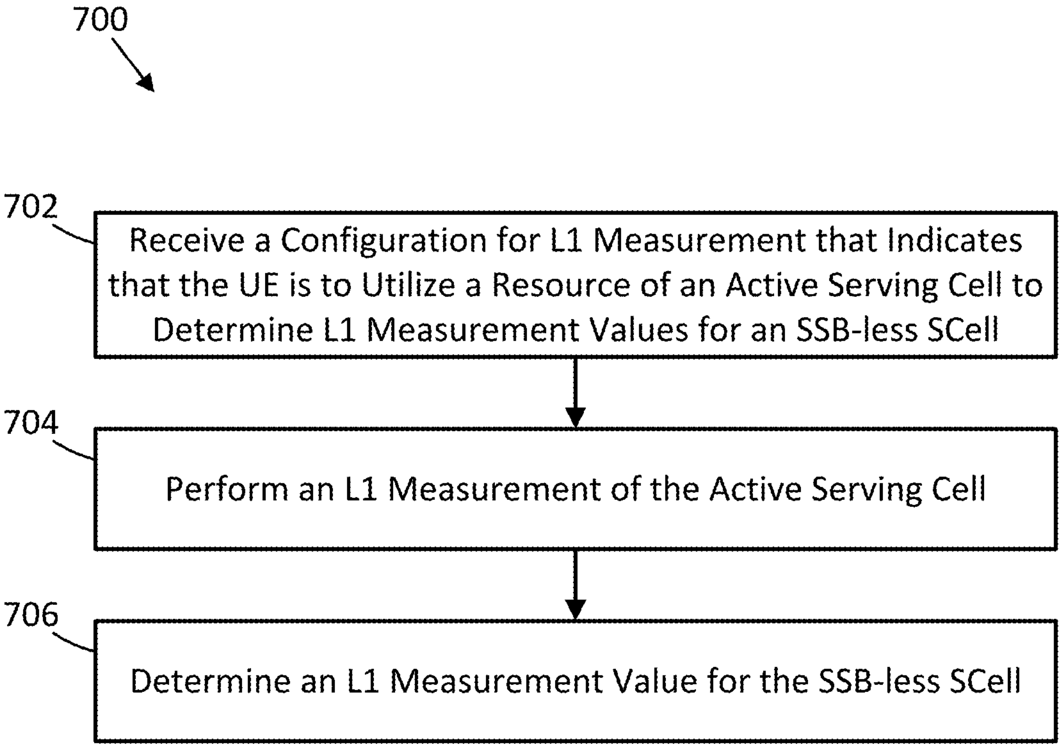
FIG. 7 illustrates an example procedure for utilizing a resource of an active serving cell to determine layer 1 (L1) measurement values for an SSB-less SCell in accordance with some embodiments.

FIG. 7 illustrates an example procedure 700 for utilizing a resource of an active serving cell to determine L1 measurement values for an SSB-less SCell in accordance with some embodiments. For example, a UE may perform the procedure 700 as part of determining L1 measurement values for an SSB-less SCell. The UE may include one or more of the features of the UE 114 (FIG. 1), the UEs 212 (FIG. 2), the contributor UEs 302 (FIG. 3), the target UE 306 (FIG. 3), and/or the UE 900 (FIG. 9).

The procedure 700 may include receiving a configuration for L1 measurement that indicates that the UE is to utilize a resource of an active serving cell to determine L1 measurement values for an SSB-less SCell in 702. For example, the UE may receive, from a base station, a configuration for L1 measurement that indicates that the UE is to utilize a resource of an active serving cell to determine L1 measurement values for an SSB-less SCell. The base station may include one or more of the features of the first base station 102 (FIG. 1), the second base station 104 (FIG. 1), the third base station 106 (FIG. 1), the first base station 204 (FIG. 2), the second base station 206 (FIG. 2), the third base station 208 (FIG. 2), the fourth base station 210 (FIG. 2), and/or the gNB 1000 (FIG. 10).

In some embodiments, the resource may include a CMR. In these embodiments, the configuration for L1 measurement may indicate that the UE is to utilize the CMR for channel measurement for the SSB-less SCell. Further, the configuration for L1 measurement may indicate that an IMR of the SSB-less SCell is to be utilized for interference measurement for the SSB-less SCell.

The procedure 700 may include performing an L1 measurement of the active serving cell in 704. For example, the UE may perform an L1 measurement of the active serving cell based at least in part on the configuration for L1 measurement to produce an L1 measurement result.

In some embodiments, the resource may include a TRS of the active serving cell. In these embodiments, performing the L1 measurement of the active serving cell may include performing the L1 measurement with the TRS of the active serving cell.

The procedure 700 may include determining an L1 measurement value for the SSB-less SCell in 706. For example, the UE may determine an L1 measurement value for the SSB-less SCell based at least in part on the L1 measurement result.

While FIG. 7, arguably, implies an order of the operations of the procedure 700, it should be understood that the operations may be performed in a different order and/or one or more of the operations may be performed concurrently in other embodiments. Further, one or more of the operations of the procedure 700 may be omitted and/or one or more additional operations may be added to the procedure 700 in other embodiments.

Figure 8:
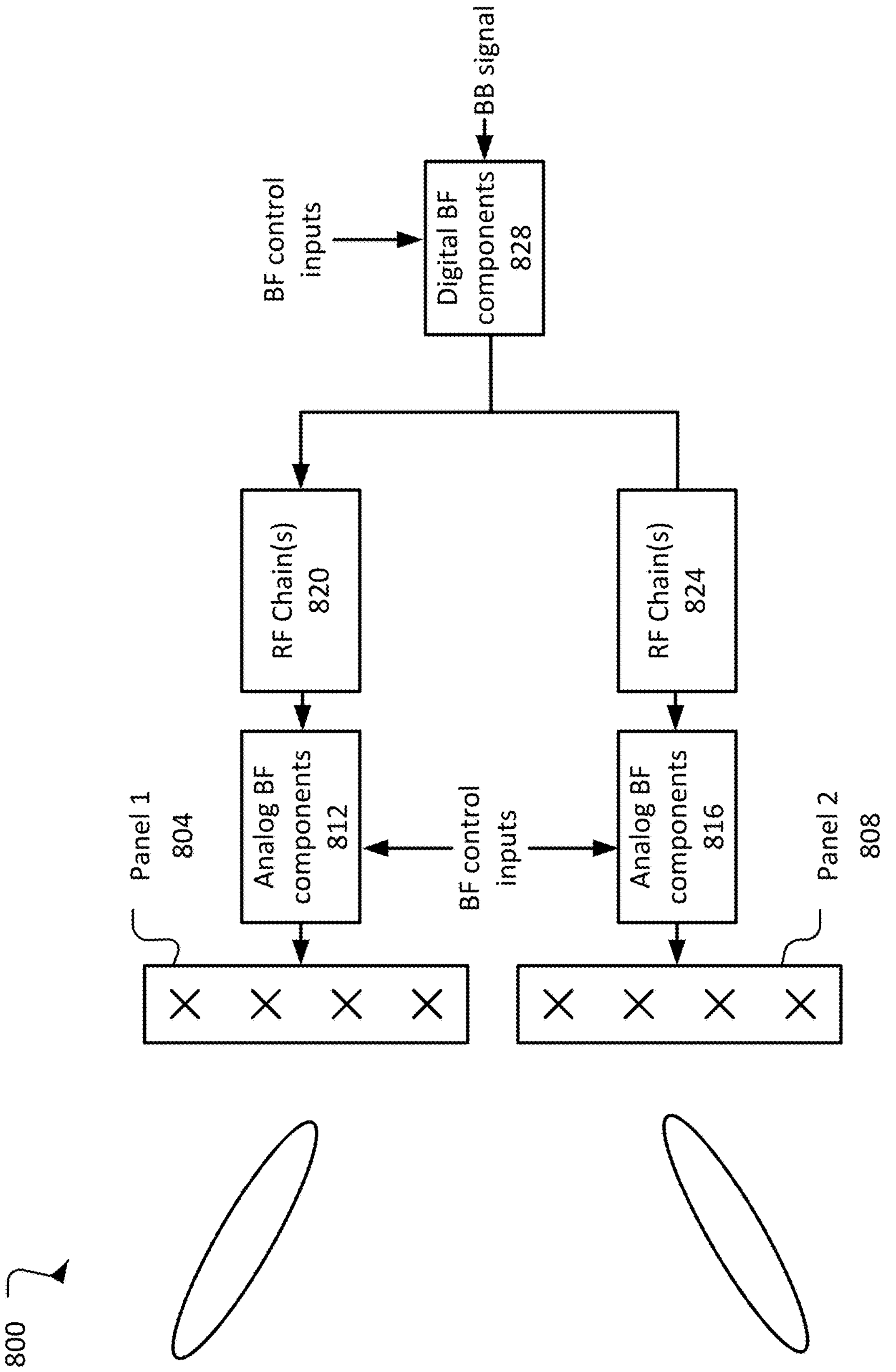
FIG. 8 illustrates example beamforming circuitry in accordance with some embodiments.

FIG. 8 illustrates example beamforming circuitry 800 in accordance with some embodiments. The beamforming circuitry 800 may include a first antenna panel, panel 1 804, and a second antenna panel, panel 2 808. Each antenna panel may include a number of antenna elements. Other embodiments may include other numbers of antenna panels.

Digital beamforming (BF) components 828 may receive an input baseband (BB) signal from, for example, a baseband processor such as, for example, baseband processor 904A of FIG. 9. The digital BF components 828 may rely on complex weights to pre-code the BB signal and provide a beamformed BB signal to parallel radio frequency (RF) chains 820/824.

Each RF chain 820/824 may include a digital-to-analog converter to convert the BB signal into the analog domain; a mixer to mix the baseband signal to an RF signal; and a power amplifier to amplify the RF signal for transmission.

The RF signal may be provided to analog BF components 812/816, which may apply additionally beamforming by providing phase shifts in the analog domain. The RF signals may then be provided to antenna panels 804/808 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 9 illustrates an example UE 900 in accordance with some embodiments. The UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 900 may be a RedCap UE or NR-Light UE.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/ output, bus (local, system, or expansion), transmission line, trace, optical connection, etc. that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), crascable programmable read only memory (EPROM), electrically eraseable programmable read only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, phased array antennas, etc. The antenna 926 may have one or more panels designed for specific frequency bands including bands in FR1 or FR2.

In some embodiments, the UE 900 may include the beamforming circuitry 800 (FIG. 8), where the beamforming circuitry 800 may be utilized for communication with the UE 900. In some embodiments, components of the UE 900 and the beamforming circuitry may be shared. For example, the antennas 926 of the UE may include the panel 1 804 and the panel 2 808 of the beamforming circuitry 800.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 922 may include software and hardware elements that operate to control particular devices that are embedded in the UE 900, attached to the UE 900, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 900 may power down for brief intervals of time and thus save power. If there is no data traffic activity for an extended period of time, then the UE 900 may transition off to an RRC_Idle state, where it disconnects from the network and does not perform operations such as channel quality feedback, handover, etc. The UE 900 goes into a very low power state and it performs paging where again it periodically wakes up to listen to the network and then powers down again. The UE 900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

FIG. 10 illustrates an example gNB 1000 in accordance with some embodiments. The gNB 1000 may include processors 1004, RF interface circuitry 1008, core network (CN) interface circuitry 1012, memory/storage circuitry 1016, and antenna structure 1026.

The components of the gNB 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 9.

The CN interface circuitry 1012 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a user equipment (UE) comprising receiving, from a base station, a configuration for performing a first layer 1 (L1) measurement on a target synchronization signal block (SSB)-less secondary cell (SCell) and a second L1 measurement on an active serving cell, performing the first L1 measurement on the target SSB-less SCell, performing the second L1 measurement on the active serving cell, determining a result difference between the first L1 measurement and the second L1 measurement, and transmitting, to the base station, the result difference.

Example 2 may include the method of example 1, wherein the result difference includes an L1-reference signal received power (L1-RSRP) difference between the first L1 measurement and the second L1 measurement, an L1-signal to interference plus noise (L1-SINR) difference between the first L1 measurement and the second L1 measurement, or a channel quality difference between the first L1 measurement and the second L1 measurement.

Example 3 may include the method of example 1, wherein the first L1 measurement is performed with a channel state information reference signal (CSI-RS) or an SSB transmitted by the target SSB-less SCell.

Example 4 may include the method of example 1 comprising receiving, from the base station, an indication to utilize further L1 measurement results of the active serving cell to determine L1 measurement values for the target SSB-less SCell, performing L1 measurements on the active serving cell after the second L1 measurement to determine the L1 measurement results of the active serving cell, and determining L1 measurement values for the target SSB-less SCell based at least in part on the L1 measurement results of the active serving cell.

Example 5 may include the method of example 1 comprising receiving, from the base station, a reference signal received power (RSRP) configuration, the RSRP configuration indicating a channel measurement resource (CMR) of the active serving cell and an interference measurement resource (IMR) of the target SSB-less SCell, performing a measurement of the CMR to produce a first measurement result, performing a measurement of the IMR to produce a second measurement result, and determining an based at least in part on the first measurement result and the second measurement result.

Example 6 may include the method of example 5, wherein the CMR includes an SSB or a channel state information reference signal (CSI-RS).

Example 7 may include the method of example 5, wherein the IMR includes a zero power-channel state information reference signal (ZP-CSI-RS) or a received signal strength indicator (RSSI) measurement symbol position.

Example 8 may include the method of example 1 comprising receiving, from the base station, an L1 measurement configuration, the L1 measurement configuration indicating a tracking reference signal (TRS) of the target SSB-less SCell, and performing an L1 measurement using the TRS.

Example 9 may include the method of example 8, wherein the L1 measurement configuration indicates that the UE is to utilize a first portion of TRS occasions for L1 measurements and a second portion of the TRS occasions for timing tracking, wherein performing the L1 measurement using the TRS includes performing the L1 measurement on a first TRS occasion from the first portion of the TRS occasions, and wherein the method comprises performing timing tracking measurements on a second TRS occasion from the second portion of the TRS occasions.

Example 10 may include a method of operating a network arrangement comprising configuring two or more user equipments (UEs) to perform layer 1 (L1) measurements on a target synchronization signal block (SSB)-less secondary cell (SCell) and at least one active serving cell, receiving, from the two or more UEs, measurement results of the L1 measurements, and determining whether the target SSB-less SCell is to omit reference signal (RS) transmissions for L1 measurement based at least in part on the measurement results.

Example 11 may include the method of example 10, wherein determining whether the target SSB-less SCell is to omit the RS transmissions includes determining whether first measurements from an active serving cell from the at least one active serving cell are within a threshold of second measurements from the target SSB-less SCell based at least in part on the measurement results.

Example 12 may include the method of example 11, wherein the first measurements from the active serving cell are determined to be within the threshold of the second measurements from the target SSB-less SCell, and wherein the method comprises configuring the target SSB-less SCell to omit the RS transmissions based at least in part on the determination that the first measurements are within the threshold of the second measurements.

Example 13 may include the method of example 10, wherein determining whether the target SSB-less SCell is to omit the RS transmissions includes determining that the target SSB-less SCell is to omit RS transmissions, and wherein the method comprises configuring a UE to utilize L1 measurement results of an active serving cell from the at least one active serving cell to determine L1 measurement values for the target SSB-less SCell based at least in part on the determination that the target SSB-less SCell is to omit the RS transmissions.

Example 14 may include the method of example 10, wherein determining whether the target SSB-less SCell is to omit the RS transmissions includes determining that the target SSB-less SCell is to omit the RS transmissions, and wherein the method comprises configuring a UE to utilize a channel measurement resource (CMR) of an active serving cell from the at least one active serving cell to perform channel measurements based at least in part on the determination that the target SSB-less SCell is to omit the RS transmissions, and configuring the UE to utilize an interference measurement resource (IMR) of the target SSB-less SCell to perform interference measurements based at least in part on the determination that the target SSB-less SCell is to omit the RS transmissions.

Example 15 may include the method of example 14, wherein the CMR includes an SSB or a channel state information reference signal (CSI-RS), and wherein the IMR includes a zero power-channel state information reference signal (ZP-CSI-RS) or a received signal strength indicator (RSSI) measurement symbol position.

Example 16 may include the method of example 10, wherein determining whether the target SSB-less SCell is to omit the RS transmissions includes determining that the target SSB-less SCell is to omit the RS transmissions, and wherein the method comprises configuring a UE to utilize a tracking reference signal (TRS) of the target SSB-less SCell for one or more L1 measurements of the target SSB-less SCell based at least in part on the determination that the target SSB-less SCell is to omit the RS transmissions.

Example 17 may include the method of example 10, wherein determining whether the target SSB-less SCell is to omit the RS transmissions includes determining that the target SSB-less SCell is to omit the RS transmissions, and wherein the method comprises configuring a UE to utilize a first portion of tracking reference signal (TRS) occasions of the target SSB-less SCell for one or more L1 measurements of the target SSB-less SCell based at least in part on the determination that the target SSB-less SCell is to omit the RS transmissions, and configuring the UE to utilize a second portion of the TRS occasions of the target SSB-less SCell for one or more timing tracking measurements of the target SSB-less SCell based at least in part on the determination that the target SSB-less SCell is to omit the RS transmissions.

Example 18 may include a method of operating a user equipment (UE) comprising receiving, from a base station, a configuration for layer 1 (L1) measurement that indicates that the UE is to utilize a resource of an active serving cell to determine L1 measurement values for a synchronization signal block (SSB)-less second cell (SCell), performing an L1 measurement of the active serving cell based at least in part on the configuration for L1 measurement to produce an L1 measurement result, and determining an L1 measurement value for the SSB-less SCell based at least in part on the L1 measurement result.

Example 19 may include the method of example 18, wherein the resource includes a tracking reference signal (TRS) of the active serving cell, and wherein performing the L1 measurement of the active serving cell includes performing the L1 measurement with the TRS of the active serving cell.

Example 20 may include the method of example 18, wherein the resource includes a channel measurement resource (CMR), wherein the configuration for L1 measurement indicates that the UE is to utilize the CMR for channel measurement for the SSB-less SCell, and wherein the configuration for L1 measurement indicates that an interference measurement resource (IMR) of the SSB-less SCell is to be utilized for interference measurement for the SSB-less SCell.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:

identify a configuration, received from a base station, for performing a first layer 1 (L1) measurement on a target synchronization signal block (SSB)-less secondary cell (SCell) and a second L1 measurement on an active serving cell;

perform the first L1 measurement on the target SSB-less SCell;

perform the second L1 measurement on the active serving cell;

determine a result difference between the first L1 measurement and the second L1 measurement; and generate a message that indicates the result difference for transmission to the base station.

2. The one or more non-transitory, computer-readable media of claim 1, wherein the result difference includes an L1-reference signal received power (L1-RSRP) difference between the first L1 measurement and the second L1 measurement, an L1-signal to interference plus noise (L1-SINR) difference between the first L1 measurement and the second L1 measurement, or a channel quality difference between the first L1 measurement and the second L1 measurement.

3. The one or more non-transitory, computer-readable media of claim 1, wherein the first L1 measurement is performed with a channel state information reference signal (CSI-RS) or an SSB transmitted by the target SSB-less SCell.

4. The one or more non-transitory, computer-readable media of claim 1, wherein the instructions, when executed, cause the processing circuitry to:

identify an indication, received from the base station, to utilize further L1 measurement results of the active serving cell to determine L1 measurement values for the target SSB-less SCell;

perform L1 measurements on the active serving cell after the second L1 measurement to determine the L1 measurement results of the active serving cell; and determine L1 measurement values for the target SSB-less SCell based at least in part on the L1 measurement results of the active serving cell.

5. The one or more non-transitory, computer-readable media of claim 1, wherein the instructions, when executed, cause the processing circuitry to:

identify a reference signal received power (RSRP) configuration received from the base station, the RSRP configuration indicating a channel measurement resource (CMR) of the active serving cell and an interference measurement resource (IMR) of the target SSB-less SCell;

perform a measurement of the CMR to produce a first measurement result;

perform a measurement of the IMR to produce a second measurement result; and determine a signal to interference plus noise ratio (SINR) based at least in part on the first measurement result and the second measurement result.

6. The one or more non-transitory, computer-readable media of claim 5, wherein the CMR includes an SSB or a channel state information reference signal (CSI-RS).

7. The one or more non-transitory, computer-readable media of claim 5, wherein the IMR includes a zero power-channel state information reference signal (ZP-CSI-RS) or a received signal strength indicator (RSSI) measurement symbol position.

8. The one or more non-transitory, computer-readable media of claim 1, wherein the instructions, when executed, cause the processing circuitry to:

identify an L1 measurement configuration received from the base station, the L1 measurement configuration indicating a tracking reference signal (TRS) of the target SSB-less SCell; and perform an L1 measurement using the TRS.

9. The one or more non-transitory, computer-readable media of claim 8, wherein the L1 measurement configuration indicates that a user equipment (UE) is to utilize a first portion of TRS occasions for L1 measurements and a second portion of the TRS occasions for timing tracking, wherein to perform the L1 measurement using the TRS includes to perform the L1 measurement on a first TRS occasion from the first portion of the TRS occasions, and wherein the instructions, when executed, cause the processing circuitry to:

perform timing tracking measurements on a second TRS occasion from the second portion of the TRS occasions.

10. A method comprising:

configuring two or more user equipments (UEs) to perform layer 1 (L1) measurements on a target synchronization signal block (SSB)-less secondary cell (SCell) and at least one active serving cell;

identifying measurement results of the L1 measurements received from the two or more UEs; and determining whether the target SSB-less SCell is to omit reference signal (RS) transmissions for L1 measurement based at least in part on the measurement results.

11. The method of claim 10, wherein determining whether the target SSB-less SCell is to omit the RS transmissions includes determining whether first measurements from an active serving cell from the at least one active serving cell are within a threshold of second measurements from the target SSB-less SCell based at least in part on the measurement results.

12. The method of claim 11, wherein the first measurements from the active serving cell are determined to be within the threshold of the second measurements from the target SSB-less SCell, and wherein the method comprises:

configuring the target SSB-less SCell to omit the RS transmissions based at least in part on the determination that the first measurements are within the threshold of the second measurements.

13. The method of claim 10, wherein determining whether the target SSB-less SCell is to omit the RS transmissions includes determining that the target SSB-less SCell is to omit RS transmissions, and wherein the method comprises:

configuring a UE to utilize L1 measurement results of an active serving cell from the at least one active serving cell to determine L1 measurement values for the target SSB-less SCell based at least in part on the determination that the target SSB-less SCell is to omit the RS transmissions.

14. The method of claim 10, wherein determining whether the target SSB-less SCell is to omit the RS transmissions includes determining that the target SSB-less SCell is to omit the RS transmissions, and wherein the method comprises:

configuring a UE to utilize a channel measurement resource (CMR) of an active serving cell from the at least one active serving cell to perform channel measurements based at least in part on the determination that the target SSB-less SCell is to omit the RS transmissions; and configuring the UE to utilize an interference measurement resource (IMR) of the target SSB-less SCell to perform interference measurements based at least in part on the determination that the target SSB-less SCell is to omit the RS transmissions.

15. The method of claim 14, wherein the CMR includes an SSB or a channel state information reference signal (CSI-RS), and wherein the IMR includes a zero power-channel state information reference signal (ZP-CSI-RS) or a received signal strength indicator (RSSI) measurement symbol position.

16. The method of claim 10, wherein determining whether the target SSB-less SCell is to omit the RS transmissions includes determining that the target SSB-less SCell is to omit the RS transmissions, and wherein the method comprises:

configuring a UE to utilize a tracking reference signal (TRS) of the target SSB-less SCell for one or more L1 measurements of the target SSB-less SCell based at least in part on the determination that the target SSB-less SCell is to omit the RS transmissions.

17. The method of claim 10, wherein determining whether the target SSB-less SCell is to omit the RS transmissions includes determining that the target SSB-less SCell is to omit the RS transmissions, and wherein the method comprises:

configuring a UE to utilize a first portion of tracking reference signal (TRS) occasions of the target SSB-less SCell for one or more L1 measurements of the target SSB-less SCell based at least in part on the determination that the target SSB-less SCell is to omit the RS transmissions; and configuring the UE to utilize a second portion of the TRS occasions of the target SSB-less SCell for one or more timing tracking measurements of the target SSB-less SCell based at least in part on the determination that the target SSB-less SCell is to omit the RS transmissions.

18. An apparatus comprising:

processing circuitry to:

identify a configuration, received from a base station, for layer 1 (L1) measurement that indicates that a user equipment (UE) is to utilize a resource of an active serving cell to determine L1 measurement values for a synchronization signal block (SSB)-less secondary cell (SCell);

perform an L1 measurement of the active serving cell based at least in part on the configuration for L1 measurement to produce an L1 measurement result; and determine an L1 measurement value for the SSB-less SCell based at least in part on the L1 measurement result; and interface circuitry coupled to the processing circuitry, the interface circuitry to communicatively couple the processing circuitry with a component of a device.

19. The apparatus of claim 18, wherein the resource includes a tracking reference signal (TRS) of the active serving cell, and wherein to perform the L1 measurement of the active serving cell includes to perform the L1 measurement with the TRS of the active serving cell.

20. The apparatus of claim 18, wherein the resource includes a channel measurement resource (CMR), wherein the configuration for L1 measurement indicates that the UE is to utilize the CMR for channel measurement for the SSB-less SCell, and wherein the configuration for L1 measurement indicates that an interference measurement resource (IMR) of the SSB-less SCell is to be utilized for interference measurement for the SSB-less SCell.

* * * * *